Dec. 31, 1935. H. A. BARNBY 2,026,118
APPARATUS FOR TIGHTENING CAPS ON CONTAINERS
Filed Oct. 31, 1934 4 Sheets-Sheet 4
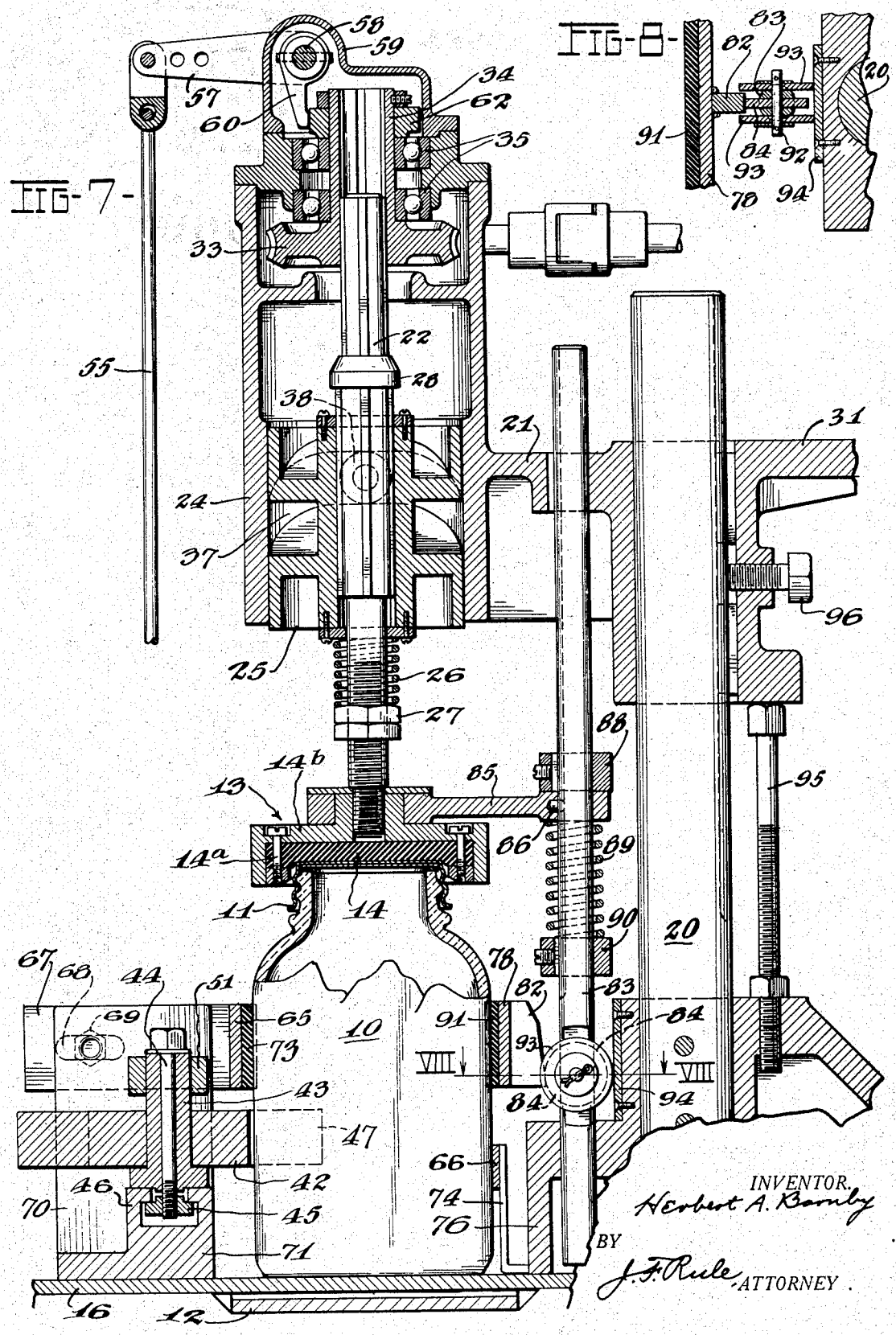
INVENTOR.
Herbert A. Barnby
BY
J. F. Rule
ATTORNEY.

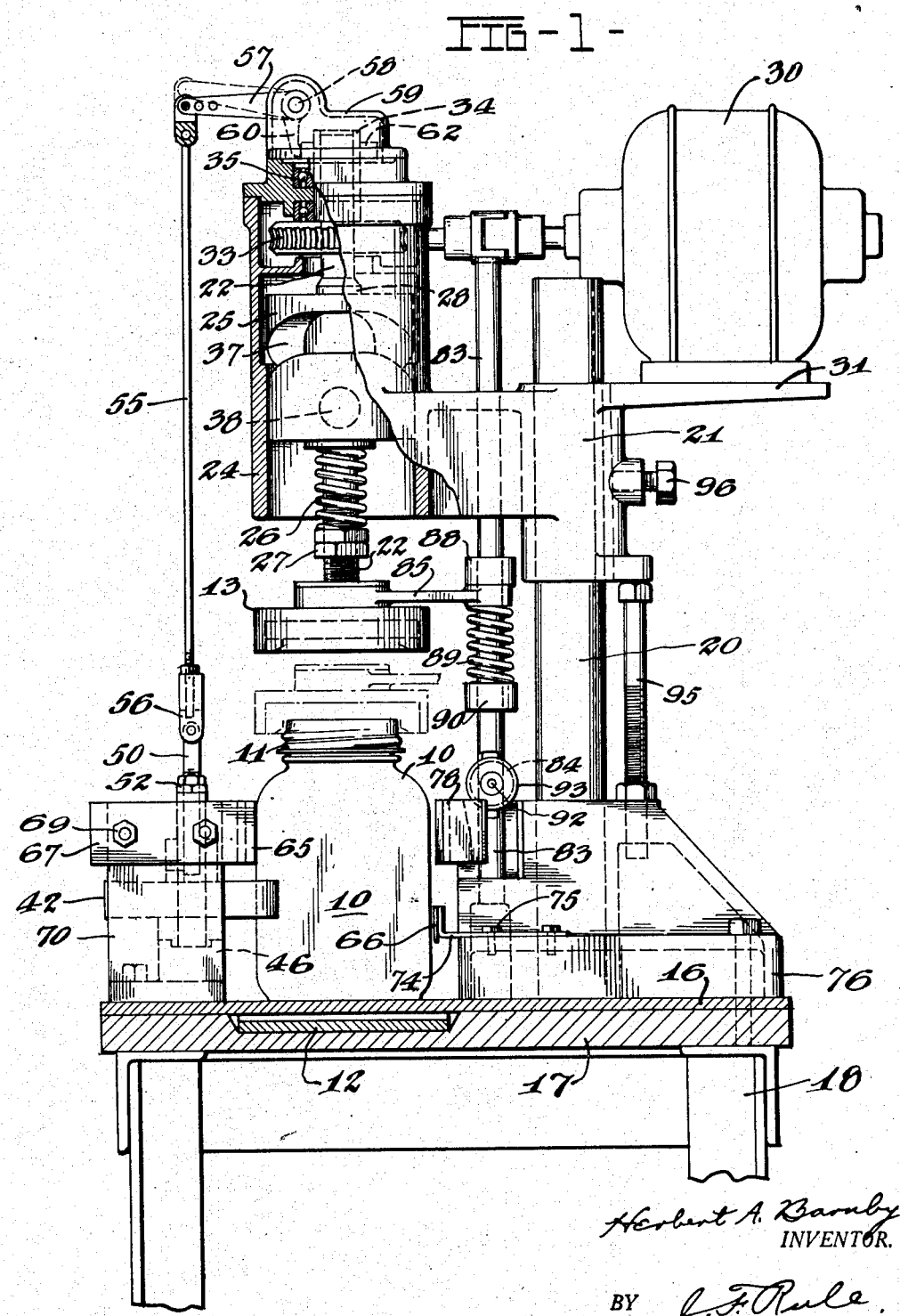

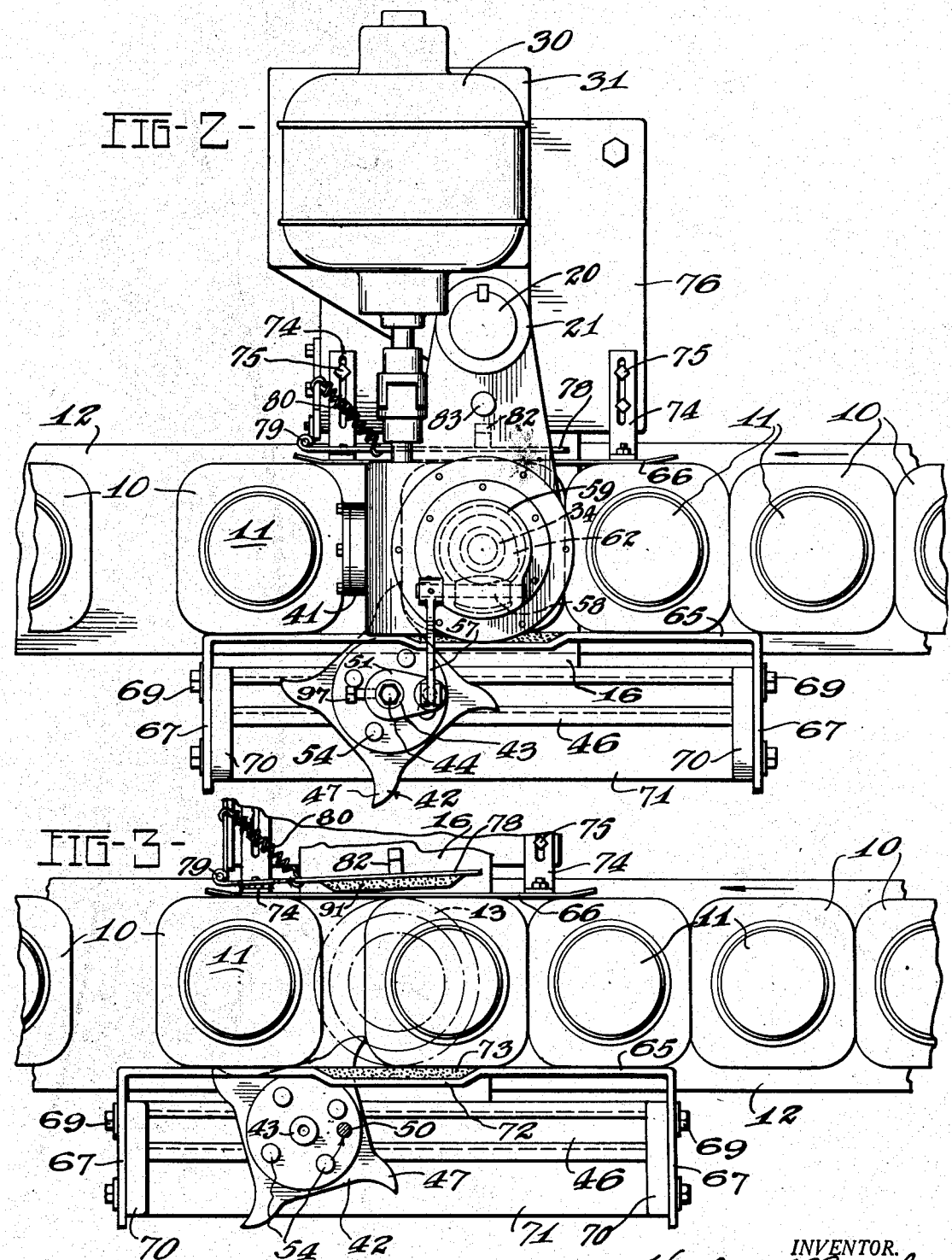

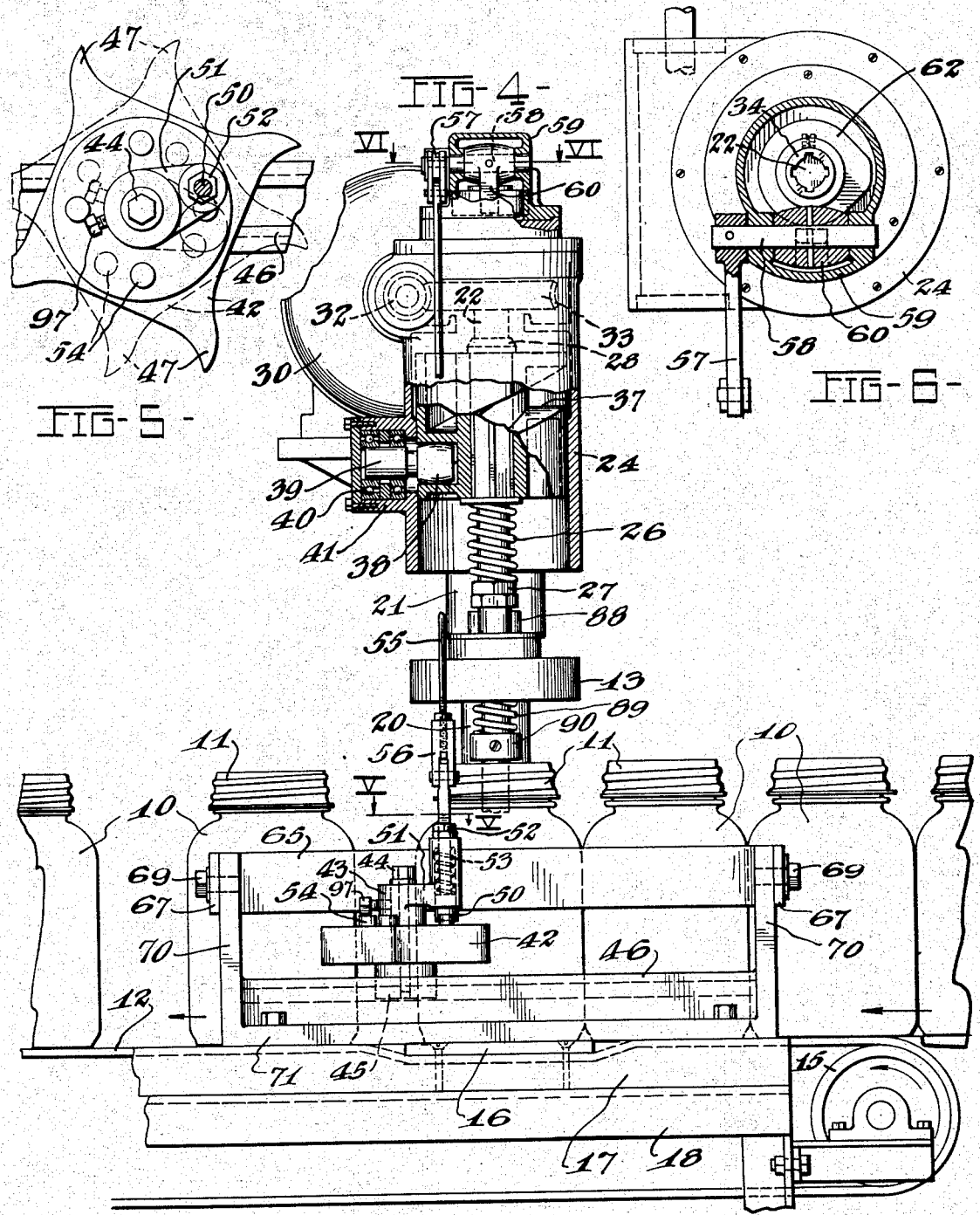

Patented Dec. 31, 1935

2,026,118

UNITED STATES PATENT OFFICE 2,026,118

APPARATUS FOR TIGHTENING CAPS ON CONTAINERS

Herbert A. Barnby, Toledo, Ohio, assignor to Owens-Illinois Glass Company, a corporation of Ohio Application October 31, 1934, Serial No. 750,810

10 Claims. (Cl. 226—88)

My invention relates to apparatus for tightening caps of closure devices on jars, bottles or other containers.

An object of the invention is to provide automatic apparatus of the character indicated, which is of simple and practical construction and which is reliable and efficient in operation.

In the operations of filling and sealing jars and the like with food products or other materials which are to be hermetically sealed, it is customary to place the screw or lug type caps loosely on the jars or containers, and as a separate operation tightening the caps and thereby finally sealing the containers. The present invention provides apparatus for effecting the final tightening of the caps on the containers.

In the packaging of some products, for example, coffee, it is customary to vacuumize the filled containers after the caps have been loosely placed thereon, and by such process effecting a sealing engagement of the caps with the containers before the caps have been finally tightened. During the final tightening operation there is sometimes a tendency for the vacuum to be lost, as the turning movement of the cap may permit the entrance of atmospheric air, particularly where there is any irregularity in the sealing surface with which the sealing gasket engages.

An object of my invention is to provide an apparatus which will operate in a manner to prevent any such air leakage as the caps are tightened. To this end, there is provided a chuck for tightening the cap and means for applying a regulated downward pressure on the cap as it is being tightened. Such downward pressure being applied to the compressible sealing gasket, causes it to conform to any irregularities in the sealing surface of the container in a manner to prevent air leakage or loss of vacuum. The invention further provides a chuck of rubber or similar suitable material which evenly distributes the top pressure and also frictionally grips the cap in a manner to prevent slippage during the tightening operation and then permits the chuck to slip without placing an excessive strain on the cap and without mutilating or marring the surface of the cap.

A further object of the invention is to provide a novel and practical mechanism for feeding the jars forward intermittently to cap tightening position and accurately and securely holding them in such position during the tightening operation, such mechanism including a star wheel controlling the forward feed of the jars and an automatic trip device permitting actuation of the star wheel in timed relation to the operations of the chuck.

Other objects of the invention will appear hereinafter.

Referring to the accompanying drawings:

Fig. 1 is a part sectional side elevation of an apparatus constructed in accordance with my invention.

Fig. 2 is a plan view of the apparatus.

Fig. 3 is a plan view showing mechanism for holding the jars at the cap tightening station and for controlling their intermittent forward movement.

Fig. 4 is a part sectional front elevation of the apparatus.

Fig. 5 is a sectional plan view at the line V—V on Fig. 4, showing the star wheel in different positions of adjustment.

Fig. 6 is a section at the line VI—VI on Fig. 4 and shows a cam for actuating the trip device.

Fig. 7 is a sectional side elevation of the apparatus on a larger scale, parts being broken away.

Fig. 8 is a section at the line VIII—VIII on Fig. 7.

Referring to the drawings, the containers 10, shown as jars, with screw caps 11 thereon, are placed on an endless belt conveyor 12 and carried thereby to a cap tightening position or station at which they are temporarily held stationary beneath a chuck 13 which operates automatically to tighten the caps, as hereinafter set forth.

The chuck includes a cap engaging pad 14 removably mounted, by means of screws 14ᵃ, in the head 14ᵇ of the chuck. The pad is made of rubber or like soft, flexible, resilient material, which insures an even distribution of pressure on the top surface of the cap and the annular sealing gasket therebeneath. The rubber or like material frictionally engages the cap in a manner to prevent slippage while the cap is being tightened, and then slips on the cap without marring the cap finish or applying an excessive turning force to the cap.

The conveyor 12 runs over a roll 15 and is preferably driven continuously in the direction indicated by the arrows. A stationary horizontal plate 16 provides a platform at the cap tightening station to receive and support the jars during the cap tightening operation. The conveyor 12 passes beneath the platform 16, the latter preferably being flush with the upper surface of the conveyor. The jars are carried to and positioned on the platform by the section or lead of the conveyor which is moving toward the platform and are carried beyond the platform by the section or lead of the conveyor extending from the opposite side of the platform. The plate 16 is supported on a table 17 on the machine frame 18. A fixed vertical standard 20 forms a support for a bracket 21 on which is carried the chuck 13 and its operating mechanism.

The chuck is secured to the lower end of a vertical spindle 22 which is mounted for vertical reciprocating movement within a stationary cylinder 24, the latter as shown being formed integral with the bracket 21. The chuck is reciprocated by means of a cam actuated piston 25 which is mounted to reciprocate within the cylinder 24. The stem 22 extends through a central bore in the piston 25 and has a splined connection therewith for causing the piston to rotate with the chuck while permitting a limited relative vertical movement of the stem and piston, as will presently appear.

A coil spring 26 is mounted on the stem 22 and held under compression between the lower end of the piston and a pair of adjusting nuts 27 threaded on said stem. The spring normally holds the chuck at the limit of its downward movement relative to the piston 25, determined by a stop 28 on said stem, but permits downward movement of the piston relative to the chuck when the latter is seated on a jar cap, as shown in Fig. 7.

An electric motor 30 mounted on a platform 31 formed integral with the bracket 21, drives a worm 32 (Fig. 4) which runs in mesh with a worm gear 33 splined on the stem 22, and thereby continuously rotates the chuck. The hub of the gear 33 has a sleeve extension 34 (Fig. 7) journaled in bearings 35 within the casing 24.

The piston 25 is formed with an annular inclined cam track or groove 37 in which runs a cam roll 38. The roll has a stem 39 journaled in bearings 40 within a stationary casing 41 which, as shown, is formed integral with the cylinder 24. As the piston 25 rotates with the stem 22, the cam roll 38 running in the inclined cam groove 37 imparts a vertical reciprocating movement to the chuck.

The forward travel of the jars 10 with the conveyor 12 is intermittently arrested by a star wheel 42 under the control of a trip device which will presently be described. The star wheel is mounted to turn on a vertical shaft 43 (Fig. 7). A clamping bolt 44 extends through a central bore in said shaft and has threaded thereon a nut 45 within a guideway 46 formed in a frame 71 hereinafter described. This guideway is positioned at one side of the conveyor belt 12 and extends parallel therewith.

The bolt 44 may be rotated in the nut 45 to unclamp the shaft 43 so that the star wheel and its shaft may be adjusted to any desired position along the conveyor. The position of adjustment depends on the size and shape of the jars. The star wheel, as shown, is formed with four points 47 and provision is made for rotating it step by step through angles of 90° so that said points are brought in succession into position to arrest a jar on the platform 16, directly beneath and in register with the chuck.

The trip mechanism for controlling the movements of the star wheel includes a stop pin 50 which is supported for up and down movement in an arm 51 carried on the star wheel shaft 43. Stop nuts 52 threaded on the pin 50 adjustably limit the downward movement of the pin under the tension of a coil spring 53 (Fig. 4). The pin extends downward into the path of stop lugs 54 on the star wheel, said lugs being equally spaced to correspond with the spacing of the points 47.

The stop pin 50 is periodically withdrawn by mechanism including a vertically disposed rod 55 having a pivotal or universal joint connection 56 with the pin. The upper end of the rod 55 is pivotally connected to a horizontally disposed rock arm 57 keyed to a rock shaft 58 journaled in a casing 59 which caps the cylinder 24. Also keyed to the shaft 58 is a depending arm 60 which contacts with a cam 62 mounted on the hub 34. The cam 62 as it rotates with the gear 33, periodically rocks the shaft 58 and operates through the rod 55 to withdraw the pin 50, thereby permitting the star wheel to be rotated. Such rotation is due to the forward movement of the jars with the belt 12. The star wheel is again arrested after each step movement by the lowering of the pin 50 under the influence of the spring 53.

The jars 10, as they are carried forward to the cap tightening station, are guided and held against lateral displacement by stationary guide bars 65 and 66 positioned above the conveyor and extending lengthwise thereof, said guide bars being in position to engage the opposite sides of the jars. The bar 65 has outturned ends 67 which are provided with elongated slots 68 (Fig. 7) to receive clamping bolts 69 by which the bar is clamped to upstanding arms 70 of the supporting frame 71. The guide bar 65 is thus adjustable to positions corresponding to the width of the containers 10. The guide bar 65 has an offset portion 72 at the cap tightening station, providing a pocket to receive a pad 73 of rubber or other suitable soft resilient material to frictionally engage and hold the jar. The guide bar 66 is mounted on brackets 74 which are slotted to receive clamping bolts 75 by which the bar is adjustably secured to a frame member or bracket 76.

A clamping bar 78 is positioned directly above the guide bar 66 and opposite the bar 65, the latter also serving as a clamping bar. The bar 78 (see Figs. 2 and 3) is mounted to swing on a vertical hinge pin 79 at one end thereof, permitting the bar to be moved to and from a jar clamping position. The bar is retracted by a coil spring 80. Mechanism for moving the bar to clamping position includes a cam 82 on the bar 78 and a vertical rod 83 which carries a cam engaging roll 84 (see Figs. 7 and 8). The rod 83 is mounted to reciprocate vertically and extends through openings in the machine frame and the bracket 21 by which the rod is guided.

An arm 85 mounted on the chuck for up and down movement therewith, is formed with an opening through which the rod 83 extends. A pin 86 carried by the arm 85 engages a vertical groove in the rod 83 to prevent rotation of the rod. A collar 88 keyed to the rod and adjustable up and down thereon, seats on the arm 85, thereby supporting the rod. A coil spring 89 is mounted on the rod and held under compression between the arm 85 and a collar 90 keyed to said rod, thereby holding the latter at the lower limit of its movement relative to the arm 85. When the chuck 13 moves downward to engage a jar cap, it carries the rod 83 downward and causes the cam roll 84 to run on the cam 82 and thereby move the arm 78 inward against the jar which is at the cap tightening station, so that the jar is gripped between the bars 65 and 78. The latter is preferably provided with a facing or pad 91 of soft rubber or the like.

The cam roll 84 is journaled on a pin 92 (Fig. 8) which extends transversely through the rod 83 and also has journaled thereon a pair of rolls 93 which engage a bearing plate 94 on the machine frame. The rolls 93 prevent lateral yielding or displacement of the rod while the cam roll is running on the cam.

The bracket 21 and parts carried thereby are adjustable vertically, permitting the chuck to be adjusted for use with containers of different heights. An adjusting bolt 95 threaded into the machine base engages beneath the bracket 21 and provides a means for accurately adjusting the parts up and down. A clamping bolt 96 serves to clamp the bracket in adjusted position.

The arm 51 which supports and guides the stop pin 50 is angularly adjustable about the axis of the star wheel for adjustably varying the stop positions of the star wheel to correspond to the size or shape of the container which is arrested thereby. Fig. 5 shows in full lines and broken lines, respectively, different positions of adjustment. A clamping screw 97 holds the arm in its adjusted position.

The operation may be summarized as follows: The continuously moving belt conveyor 12 carries the jars with the caps thereon, one by one to the cap tightening station at which the jars are arrested on the platform 16 by the star wheel 47, each jar passing between the guide bars 65 and 66 as it approaches the stop position. When a jar reaches said position, the clamping bar 78 is operated to grip it between said bar and the oppositely disposed bar 65, securely and accurately holding the jar during the cap tightening operation.

The chuck 13 and piston 25 are continuously rotated by the motor 30, so that the cam roll 38 running in the cam groove 37 moves the chuck up and down. When it moves down, it engages the jar cap and frictionally holds it while the chuck rotates through a predetermined angle, thereby tightening the cap on the jar. The piston 25 operates through the spring 26 to apply a yielding downward pressure to the cap during the tightening operation. The cap engaging chuck plate being made of rubber or other soft material, insures an even distribution of such pressure over the top surface of the cap, so that the sealing ring or gasket is held in close contact with the sealing surface or lip of the jar at all points, regardless of any slight irregularities in said surface, thus preventing air leakage during the cap tightening operation. As the chuck is withdrawn from the tightened cap, the cam 62 (Figs. 6 and 7) operates through the rod 55 to withdraw the stop pin 50 and release the star wheel so that the latter is rotated through one step movement by the oncoming jars, the star wheel being then arrested to stop the next succeeding jar in position. The chuck as it moves upward, carries the rod 83 with it, thereby releasing the clamping bar 78 so that the jars are free to advance.

Modifications may be resorted to within the spirit and scope of my invention.

I claim:

1. Apparatus for tightening caps on containers, which comprises means for holding a container at a cap tightening station, a chuck at said station, a vertical stem carrying said chuck, means for rotating the chuck, and means for periodically moving the chuck up and down for bringing it into operative engagement with a cap on the container, said chuck comprising a pad of soft resilient material to engage the cap and apply top pressure thereto while the chuck rotates, the means for moving the chuck up and down comprising a cam mounted on said stem for rotation therewith and a cam roll having a stationary mounting, said roll engaging the cam and operative to move it vertically.

2. Apparatus for tightening caps on containers, comprising the combination of a chuck, a vertical stem carrying said chuck, a cylinder, a piston movable up and down therein, said piston being mounted on said stem, means for rotating said stem and piston, said piston being formed with an endless cam track surrounding said stem, a cam roll running on said track and having a stationary mounting in said cylinder, said track shaped to cause up and down movement of the cam, said stem and chuck being movable up and down with the cam.

3. Apparatus for tightening caps on containers, comprising the combination of a chuck, a vertical stem carrying said chuck, a cylinder, a piston movable up and down therein, said piston being mounted on said stem, means for rotating said stem and piston, said piston being formed with an endless cam track surrounding said stem, a cam roll running on said track and having a stationary mounting in said cylinder, said track shaped to cause up and down movement of the cam, said stem and chuck being movable up and down with the cam, means providing a yielding connection between the chuck and said cam by which the chuck may be held with a yielding pressure against a cap while permitting a limited downward movement of the piston relative to the chuck.

4. Apparatus for tightening caps on containers, including a stationary platform, a continuously traveling conveyor having leads extending to and from opposite sides of the platform and in the plane thereof, by which containers are moved in succession to and from a cap tightening station at which the container is supported on said platform, said conveyor extending beneath the platform, stationary guide bars extending lengthwise of the conveyor and positioned to guide the containers as they are brought to said station, means for clamping the containers at said station, a chuck, means for reciprocating the chuck vertically and thereby moving it downward into engagement with caps loosely placed on said containers, and means for rotating the chuck for tightening the caps.

5. Apparatus for tightening caps on containers, including a stationary platform, a continuously traveling conveyor by which containers thereon are moved in succession to a cap tightening station at which the container is supported on said platform, a stop device rotatable step by step and brought at each step rotation into position to arrest a container at said station, escapement mechanism controlling the step movements of the stop device, stationary guide bars extending lengthwise of the conveyor and positioned to guide the containers as they are brought to said station, means for clamping the containers at said station, a chuck, means for reciprocating the chuck vertically and thereby moving it downward into engagement with caps loosely placed on said containers, and means for rotating the chuck for tightening the caps.

6. In an apparatus for tightening caps on containers, the combination of a stationary platform, a continuously traveling conveyor by which containers thereon are moved in succession to a cap tightening station at which the container is supported on said platform, a stop device rotatable step by step and brought at each step rotation into position to arrest a container at said station, escapement mechanism controlling the step movements of the stop device, stationary guide bars extending lengthwise of the conveyor and positioned to guide the containers as they are brought to said station, and means for clamping the containers at said station.

7. Apparatus for tightening caps on containers, including a stationary platform, a continuously traveling conveyor by which containers thereon are moved in succession to a cap tightening station at which the container is supported on said platform, a stop device rotatable step by step and brought at each step rotation into position to arrest a container at said station, means for screwing a cap home on the container while at said station, escapement mechanism controlling the step movements of the stop device, said escapement mechanism including a stop pin, lugs on said stop device, and means for periodically moving said stop pin into and out of the path of said lugs.

8. The combination of a continuously traveling conveyor for advancing a row of containers placed thereon, a star wheel mounted for rotation adjacent said conveyor and having points adapted to be brought in succession into the path of said containers and thereby arresting the containers, and escapement mechanism controlling the rotation of said star wheel, said escapement mechanism including stops on said wheel, a stop pin, means for periodically moving said stop pin into the path of said stops and thereby arresting the star wheel in position to hold said containers, and permitting a step movement of the star wheel when said stop pin is withdrawn, a guide for the stop pin, and means for angularly adjusting said guide and with it the stop pin, about the axis of the star wheel and thereby adjusting the stop positions of the star wheel.

9. Apparatus for tightening caps on containers, comprising a continuously traveling horizontally disposed conveyor by which the containers are carried in succession to and from a cap tightening station, a platform to receive and support the containers at said station during the cap tightening operations, said conveyor comprising leads extending to and from the platform at opposite sides thereof and substantially in the plane of the platform, said conveyor extending beneath the platform, a chuck spaced above the platform, means for moving the chuck downward into position for tightening a cap on a container supported on the platform, means for rotating the chuck for tightening the cap, a clamping device for holding the container while the cap is being tightened, and means interconnected with the chuck operating mechanism for automatically actuating the clamping device.

10. Apparatus for tightening caps on containers, comprising a continuously traveling horizontally disposed conveyor by which the containers are carried in succession to and from a cap tightening station, a platform to receive and support the containers at said station during the cap tightening operations, said conveyor comprising leads extending to and from the platform at opposite sides thereof and substantially in the plane of the platform, said conveyor extending beneath the platform, a chuck spaced above the platform, means for moving the chuck downward into position for tightening a cap on a container supported on the platform, means for rotating the chuck for tightening the cap, guides extending lengthwise of said conveyor in position to guide the articles as they are carried to and from their said position on the platform, a clamping bar, and automatic mechanism interconnected with the chuck operating means and said clamping bar to actuate said clamping bar and cause an article to be clamped between said bar and one of said guides during the cap tightening operation.

HERBERT A. BARNBY.